UNITED STATES PATENT OFFICE.

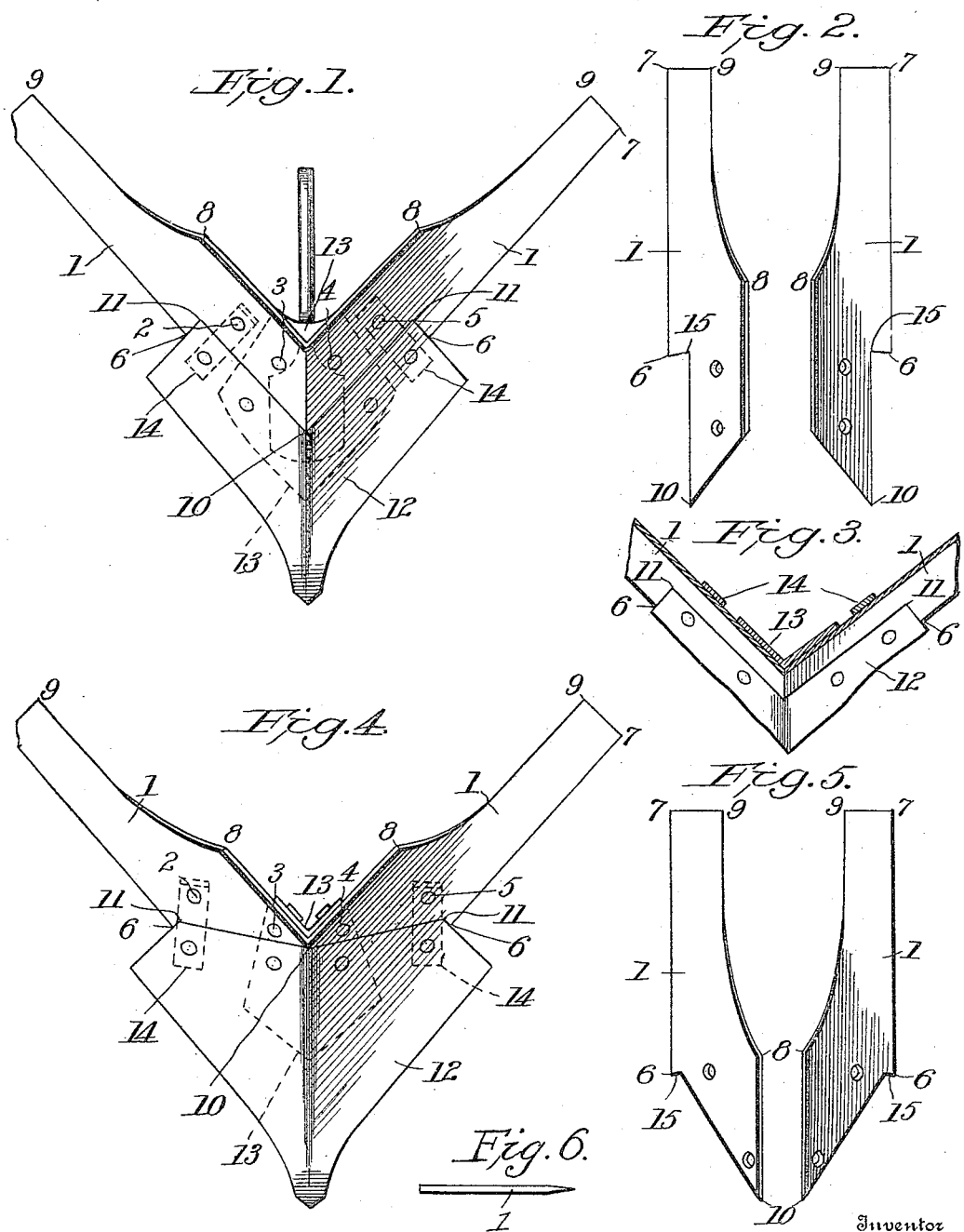

CHARLES H. SOUCEK, OF LAMONT, OKLAHOMA TERRITORY.

LISTER ATTACHMENT.

No. 817,812.
Specification of Letters Patent.
Patented April 17, 1906.

Application filed September 12, 1905. Serial No. 278,155.

*To all whom it may concern:*

Be it known that I, CHARLES H. SOUCEK, a citizen of the United States, residing at Lamont, in the county of Grant and Territory of Oklahoma, have invented a certain new and useful Lister Attachment, of which the following is a specification, reference being had therein to the accompanying drawings.

This invention relates to implements for tilling and leveling the soil, and has special reference to an attachment for listers adapted to loosen and break and level the surface soil after it has been plowed by the lister and the soil is in the form of ridges and depressions or furrows as it is left by the lister.

The greatest drawback to the lister has been the want of some simple, practical, and effective way of leveling or bursting the ridges and filling the furrows made by it and at the same time cutting, breaking, and loosening and stirring the soil that has been left unbroken and unstirred in the ridges formed in previously listing the ground.

The invention hereinafter described supplies the above-mentioned want both as to simplicity and practicability and effectively and successfully accomplishes the purpose referred to.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a plan view of the share of a lister with the moldboards removed and the blades of this invention applied thereto. Fig. 2 is a plan view of the blades detached. Fig. 3 is a sectional view showing the means for securing the blades to the share. Fig. 4 is a plan view showing a modified form of share and blades. Fig. 5 is a plan view of the detached blades of Fig. 4. Fig. 6 is a cross-section through one of the blades.

Like reference-numerals designate corresponding parts in all figures of the drawings.

In the accompanying drawings I have shown the preferred embodiment of this invention, it being understood that the right is reserved to make such changes and modifications in the form, proportion, and minor details of the invention as properly fall within the scope of the appended claims without departing from the principle or sacrificing any of the advantages of the same.

The blades forming the attachment are ordinarily constructed out of plowshare-steel of sufficient thickness and strength and are cut to fit the share and bolted in the same place as the lower portions of the moldboards (not shown) by means of bolts at the points 2, 3, 4, and 5. The portion of the blades 1 extending back from the points 6, where they fit the rear upper corners of the share, are pitched at the proper inclination and also flared laterally, and their anterior or forward edges are sharpened, so as to easily enter and cut the soil.

The blades 1 are cut to taper from the points 8 to the rear extremities 9 and may be made of any suitable or required width to roll down into the furrows the proper quantity of loose soil. The portion of each blade 1 extending from the point 8 to the rear extremity is gradually laid down or disposed horizontally like the wing or rear portion of a breaking or sod plowshare, thus enabling it to cut and break the soil and allow the same to slip backward over the blade with ease.

Between the points 10 and 11, where the attachment fits accurately against the edge of the share 12, each blade is of the same thickness as the share, so that the working faces of the blades are practically a continuation of the share. The holes at the points 2, 3, 4, and 5 are countersunk to receive the heads of plow-bolts to fasten the blades securely to the frog 13 and the lugs 14, connected with the share, and by means of which the usual moldboards are secured in place.

The ordinary lister leaves the soil in a very unlevel condition unsuitable for a seed-bed for small grain, but in the best condition to catch and hold moisture. The lister throwing the soil to both sides and leaving a furrow puts the surface of the soil into alternate ridges and depressions. As the soil is plowed the major portion thereof in the ridge remains uncut and unbroken, being only covered by the loose soil taken out from the furrow and thrown upon the ridge from both sides. Now to level down these ridges and break and stir the soil that has been left untouched by the lister is a difficult task, requiring considerable labor and special tools and implements, such as cultivators and levelers in addition to the lister, necessitating an extra outlay and expenditure without doing the work as it should be done.

This invention not only accomplishes the operation of leveling and breaking up and stirring the soil of the ridges, but it also makes use of the same implement employed in the original step or operation of plowing. In bursting or leveling the lister ridges, to leave on the moldboards, as at first, does not materially improve the condition of the soil. To take off the moldboards altogether and use the share alone does not prove effective in rolling the loose soil down into the furrows to a sufficient extent, most of the soil slipping backward over the share and remaining on the ridges. Moreover, as the ridge is generally wider than the share a portion of the soil is left on the ridge uncut and unbroken, the weeds being also undisturbed. The attachment hereinabove described entirely overcomes this difficulty and rolls the right quantity of soil into the furrows on each side of the ridge, the blades cutting backward and laterally of the share, thus breaking and stirring that part of the ridge which is beyond the limits of the share.

It will be understood that the invention is to be used on a lister-plow, in combination with a lister-share and attached to the lister, being bolted to the share; also, that it may be made in various sizes and pitched at different angles; also, that it may be utilized on walking, gang, or riding listers. Each of the blades 1 may also be cut to provide a shoulder 15, which engages the rear upper corner of the share to properly position the blade in relation to the share and stiffen the connection between the blade and share.

Having described the invention, I claim—

1. The combination with the frog and share of a lister-plow, of detachable blades having lateral extensions which project beyond the share and are sharpened on their forward edges, the rear edges beginning at the last point of contact with the share being given a spiral twist toward the outer extremities of the blades until the top and bottom surfaces of said extremities are substantially horizontal.

2. The combination with the lister share and frog of a plow, of detachable blades constructed to conform to the shape of the top edge of the share, the projecting portions of said blades being spirally twisted from the frog outward until the top and bottom surfaces of the extremities of the blades are substantially horizontal, said blades being bolted to the frog and bracket-lugs behind the share through perforations in said frog and bracket and blades.

In testimony whereof I affix my signature in presence of two witnesses.

CHARLES H. SOUCEK.

Witnesses:
   A. MUEGGE,
   J. E. SUMILLER.